3,053,745
PHOTOPOLYMERIZATION OF VINYL MONOMERS BY MEANS OF A MIXTURE OF SILVER COMPOUNDS AS CATALYSTS

Steven Levinos, Vestal, N.Y., assignor to General Aniline & Film Corporation, New York, N.Y., a corporation of Delaware
No Drawing. Filed Oct. 8, 1958, Ser. No. 765,958
23 Claims. (Cl. 204—158)

The present invention pertains to the formation of solid polymers by photopolymerizing or copolymerizing normally liquid or solid monomeric vinyl compounds while employing as the catalyst a mixture of an insoluble silver halide and a silver salt having higher water solubility than the insoluble silver halide.

It has been proposed to photopolymerize vinyl compounds in the presence of water while utilizing a radiation-sensitive silver compound as the catalyst by irradiating the monomer and silver compound with rays having a wave length of from $10^{-1}$ to $10^{-10}$ centimeters. Polymerization in this fashion to yield solid high molecular weight polymers may be carried out in bulk or imagewise in coatings containing the monomer and the silver compound. As silver compounds recommended for use as the catalyst, reference may be made to silver acetate, silver acetylide, silver benzoate, the silver halides, silver citrate and the like.

I have now discovered that the rate at which vinyl monomers may be photopolymerized or copolymerized can be greatly increased if there be employed as the catalyst a mixture of an insoluble silver halide such as the chloride, bromide or iodide, and a silver compound having solubility in water greater than the solubility of any of the aforementioned silver halides.

A further discovery involves promoting the catalytic activity of this mixture by resort to the use of small amounts of metal oxides capable of forming amphoteric bases.

An additional and very important finding is that my catalytic system becomes even more effective when there are employed small amounts of optical sensitizing dyes such as erythrosin, eosin, pinacyanol, 1,1'-diethyl-2,2'-cyanineiodide and similar cyanine sensitizing dyes disclosed in Chapter 7 of "Photography, Its Materials and Processes" by C. D. Neblette (fifth edition) published by D. Van Nostrand Company, Inc., New York City.

The direct formation of solid polymers by radiation with radiations ranging in wave length from $10^{-1}$ to $10^{-10}$ centimeters of monomeric vinyl compounds which are normally liquid or solid (at room temperature) in the presence of a mixture of an insoluble silver halide and a more water soluble silver compound as the catalyst and, if desired, with a small amount of an amphoteric metal oxide as a promoter for the catalyst with or without a small amount of an optical sensitizing dye constitutes the purposes and objects of my invention.

The particular mechanism by which photopolymerization is achieved by use of my mixed silver catalyst system has not been ascertained and is not self-evident. I believe that the photopolymerization is due to the presence of free radicals produced during the decomposition of the silver halide. However, regardless of the theory, I have established beyond peradventure that the mixed catalyst system of a silver halide and a more water soluble silver compound greatly enhances the polymerization rate.

The silver halide which I use in my catalytic system may be silver bromide, silver chloride or silver iodide. Preferably the halide is formed in the reaction mixture by adding an alkali metal or ammonium halide in an amount insufficient to precipitate all of the soluble silver salt present.

This method of forming silver halides by the use of potassium bromide, potassium chloride, sodium chloride, potassium iodide, ammonium chloride and the like is well known in the art and, hence, need not be elaborated on.

The soluble component of the catalytic mixture must possess the following prerequisites:

(1) It must, as has been stated, be more water soluble than any of the insoluble silver halides; and
(2) It must not possess an anion which is a halogen acceptor such as, for example, a nitrite ion.

Silver compounds within the contemplation of the invention are silver acetate, silver benzoate, silver citrate, silver fluoride, silver lactate, silver laurate, silver phenolsulfonate, silver nitrate, silver picrate, silver selenate, silver oxalate, silver salicylate, silver sulfonate, silver sulfate, silver tartrate and the like. These are merely representative examples of suitable silver compounds to be used with silver halide, it being manifest that with the stated prerequisites, any person skilled in the art could select other suitable silver compounds.

It will be noted that none of the silver compounds listed are active oxidizing agents. Silver perchlorate, for example, would be excluded even if it met the above prerequisites since it reacts explosively with vinyl compounds even in the dark and causes the vinyl compound to undergo oxidation rather than polymerization. Similarly, silver compounds which decompose when stored in darkness are not suitable for use, as is self-evident.

Only catalytic amounts of the silver compounds are required. This means that the silver compounds will be employed in an amount which is exceedingly small when measured against the quantity of monomer. I have effectively used the silver compounds in an amout by weight as low as $\frac{1}{1000}$ of the weight of the monomer and as high as 10% by weight of the monomer. Greater amounts of silver catalyst by weight may be employed but, as is evident, would serve no useful purpose.

The quantities of the two silver compounds in the catalytic mixture will vary from .9 to .5 part of halide to .1 to .5 part of the more soluble silver compound. In general, my investigations establish that where the silver halide in the catalytic mixture is silver bromide, the combination is fastest due to the higher light sensitivity of the silver bromide. The bromide systems which I envisage are also substantially faster than a system using only silver bromide as the catalyst and substantially faster than any other all-soluble silver system as, for instance, one composed of silver nitrate. My system containing silver chloride as the silver halide is faster than a silver chloride system per se and substantially faster than an all-soluble silver system such as silver nitrate. A combination in which silver iodide is present is moderately faster than a system using only silver iodide, and substantially faster than an all-soluble silver system, i.e., silver nitrate. However, the silver iodide combination systems are slower than those in which the silver halide is silver bromide or silver chloride.

It has also been ascertained that my very active silver combination system can be made even faster by the addition to the reaction mixture of a small quantity of an amphoteric metal oxide such as zinc oxide, titanium dioxide, zirconium dioxide and silicon dioxide. These oxides are all available on the open market and may be obtained in various physical forms. Typically, silicon dioxide is sold by several companies in the form of a colloidal dispersion or in the form of a fine powder which may readily be dispersed.

The effect of the amphoteric metal oxide appears to be synergistic inasmuch as the amphoteric metal oxide reduces the time necessary for the silver compounds to effect photopolymerization. This effect is not evident and appears to be impossible of ascertainment.

The quantity of amphoteric metal oxide which may be employed if desired ranges from about .01 to 1% by weight of the monomer. Larger amounts may, of course, be used but no improvement in results follows from such larger use. As a matter of fact, since excesses of the metal oxides will settle out from a water solution of the components, excesses should be avoided.

Any normally liquid to solid monomeric vinyl compound or mixtures thereof may be photopolymerized by irradiation in the presence of my catalytic system. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups each linked to a carbon atom in a straight chain or in a ring. These compounds serve to cross-link the polyvinyl chains and are generally designated as cross-linking agents. Such agents are described, for example, by Kropa and Bradley in vol. 31, No. 12, of "Industrial and Engineering Chemistry," 1939. Among such cross-linking agents for my purpose may be mentioned N,N'-methylene-bis-acrylamide, triallyl cyanurate, divinyl benzene, divinyl ketones and diglycol-diacrylate.

The cross-linking agent is generally employed in an amount ranging from 10 to 50 parts of monomer to each part of the cross-linking agent. It is understood that the greater the quantity of cross-linking agent within such range, the harder the polymer obtained.

The photopolymerization hereof is effected in aqueous dispersions of the involved components. If a water insoluble monomer is used, it may be dispersed in water by means of a surfactant followed by the addition of silver salts, promoters and sensitizing dyes if desired. Suitable surfactants are, for example, long chain fatty acid sarcosides or taurides, i.e., oleyl-N-methyl taurine, stearyl sarcosine; keryl benzene sulfonate (made by reacting chlorinated kerosene with benzene and sulfonating the resulting product); the reaction product of from 12 to 20 mols of ethylene oxide with a phenol such as dibutyl phenol, a fatty alcohol, i.e., lauryl alcohol, an amine, i.e., rosin amine or a fatty acid, i.e., stearic acid; dioctyl sulfo succinate; fatty alcohol sulfonates, i.e., α-hydroxyoctodecane sulfonic acid, lauryl sulfonate or the like.

In some cases, thickening agents such as carboxymethyl cellulose may be used to keep the silver halides such as silver iodide suspended in the reaction mixture.

The pH of the reaction mixture may have a bearing on the rate a which polymerization is initiated. I find that the mixture should not be either too highly acid or too highly alkaline. Preferably, I operate at or near the neutral point of the reaction mixture.

If bulk polymerization is desired, the reaction is carried out in any of the usual reactors while irradiating the walls thereof with UV, visible light, X-rays or gamma-rays. If UV or visible light radiation is employed, the walls of the reactors should be of glass or similar materials transparent to these rays. If X- or gamma-radiation is resorted to, the walls may be of any material permeable thereto, such as glass, steel, aluminum or the like.

The UV radiation, either for bulk or imagewise polymerization, may be derived from a carbon arc lamp or a high intensity mercury vapor lamp. Visible radiation may be supplied by photoflash lamps or a tungsten filament lamp. A conventional X-ray machine may serve as a source of such rays, whereas cobalt 60 may be utilized to supply gamma radiation. The source of the rays is generally located a short distance, say 4½ to 12", from the walls of the reactor.

The photopolymerization may also be carried out by feeding in monomer, silver compound and amphoteric metal oxide and withdrawing the polymer as formed. For a continuous operation, use may be made of the apparatus described in U.S.P. 2,122,805 granted July 5, 1938.

The polymers may be formed in bulk and also imagewise. In the latter case, a partially polymerized mass which is still water soluble or water dispersible, such as polyacrylamide, may be coated on a base with a monomer, i.e., vinyl acetate, and the catalyst with the promoter if desired. When such a system is exposed under a pattern, the polymer is formed imagewise. The image may then be developed by removing the monomer from the non-exposed areas.

The following examples will serve to illustrate my invention, although it is to be understood that the invention is not restricted thereto.

*Example I*

A composition hereinafter called W–5 was prepared from the following components:

| | | |
|---|---|---|
| Acrylamide | g | 180 |
| N,N'-methylene-bis-acrylamide | g | 7 |
| Water | cc | 100 |

To 5 cc. of this solution there were added 1 cc. of an aqueous solution containing 3.98 mg. of silver nitrate and 1 cc. of an aqueous solution containing 1.4 mg. of potassium bromide. Reaction between the bromide and nitrate converts half of the silver to silver bromide to produce a mixed system of silver nitrate and silver bromide. By irradiating the resulting mixture with a 150 watt tungsten lamp at a distance of 5" from the lamp, photopolymerization occurred with the formation of a solid polymer in 6¼ minutes.

7 cc. of the same composition from which, however, the potassium bromide was omitted were irradiated under the same conditions. In this case, photopolymerization did not occur until 17½ minutes.

*Example II*

To 5 cc. of W–5 were added 1 cc. of an aqueous solution containing 3.98 mg. of silver nitrate and 1 cc. of an aqueous solution containing .68 mg. of sodium chloride. Reaction between the nitrate and chloride produced a mixed catalyst in which one-half of the silver is silver chloride and the other half is silver nitrate.

By irradiating this composition with a 150 watt tungsten lamp at a distance of 4¾", photopolymerization to a solid polymer ensued in 6¾ minutes.

By irradiating 7 cc. of the same solution from which, however, the sodium chloride had been omitted under the same conditions required 14 minutes to effect photopolymerization.

*Example III*

To 5 cc. of W–5 were added 1 cc. of an aqueous solution containing 3.98 mg. of silver nitrate and 1 cc. of an aqueous solution containing 1.94 mg. of potassium iodide. One-half of the silver was thus converted to silver iodide.

Irradiation of this solution with a tungsten lamp as in the previous examples at a distance of 5¼" resulted in photopolymerization to a solid polymer taking place in 14 minutes.

Irradiation of 7 cc. of the same solution from which the potassium iodide had been omitted under the same conditions required a period of 21½ minutes for photopolymerization.

Example IV

To 5 cc. of W-5 there were added .4 cc. of an aqueous solution containing 1.6 mg. of silver nitrate, .6 cc. of an aqueous solution containing .85 mg. of potassium bromide, and .4 cc. of water. Three-fourths of the silver was converted to silver bromide.

Irradiation of this solution with a light source as above at a distance of 6" caused photopolymerization to a hard polymer to take place in 6½ minutes.

To 5 cc. of W-5 were added .4 cc. of an aqueous solution containing 1.6 mg. of silver nitrate and 1.2 cc. of an aqueous solution containing 1.4 mg. of potassium bromide. All of the silver was converted to silver bromide.

Irradiation of this solution as above at a distance of 6" from the light source resulted in photopolymerization taking place in 16 minutes.

Example V

To 5 cc. of W-5 were added .4 cc. of an aqueous solution containing 1.6 mg. of silver nitrate, .6 cc. of an aqueous solution of sodium chloride and .4 cc. of water.

Three-fourths of the silver was converted to silver chloride.

Irradiation of the reaction mixture with a tungsten lamp as above at a distance of 6" from the lamp caused photopolymerization to take place in 7 minutes.

To 5 cc. of W-5 were added .4 cc. of an aqueous solution containing 1.6 mg. of silver nitrate and 1 cc. of an aqueous solution containing .68 mg. of silver chloride. All silver was thus converted to silver chloride.

Irradiation of this reaction mixture under the same conditions as above resulted in photopolymerization ensuing in 7¾ minutes.

Example VI

To 5 cc. of W-5 there were added 1 cc. of an aqueous solution containing 3.98 mg. of silver nitrate and 1 cc. of an aqueous solution containing 1.4 mg. of potassium bromide. One-half of the silver was converted to silver bromide.

By irradiating the reaction mixture with a tungsten lamp at a distance of 10", photopolymerization to a hard polymer took place in 8½ minutes.

Example VII

To 5 cc. of W-5 were added 1 cc. of an aqueous solution containing 3.98 mg. of silver nitrate and 1 cc. of an aqueous solution containing .68 mg. of sodium chloride. One-half of the silver was converted to silver chloride.

Irradiation of the reaction mixture as above at a distance of 10" caused photopolymerization to take place in 10¾ minutes. A comparison of this example with Example VI establishes the greater catalytic effect of mixtures containing silver bromide as the silver halide.

Example VIII

To 5 cc. of W-5 were added .4 cc. of an aqeuous solution containing 1.6 mg. of silver nitrate, .6 cc. of an aqueous solution containing 1.16 mg. of potassium iodide, .4 cc. of water and 75 mg. of carboxymethyl cellulose as a thickener to keep the silver suspended.

Three-fourths of the silver was in the form of the iodide.

Irradiation of this reaction mixture with the light of a 150 watt tungsten lamp at a distance of 6" caused photopolymerization to take place in 21 minutes.

To 5 cc. of W-5 there were added .4 cc. of an aqueous solution containing 1.6 mg. of silver nitrate, 1 cc. of an aqueous solution containing 1.94 mg. of potassium iodide and 75 mg. of carboxymethyl cellulose. All silver was converted to silver iodide.

Irradiation of this reaction mixture required 26 minutes to effect the photopolymerization while using the same light source and distance as above.

Example IX

The procedure was the same as in Example I excepting that the composition was irradiated with UV light. In this procedure, photopolymerization was complete after a few minutes. The polymer obtained was that similar to Example I.

Example X

The procedure was the same as in Example I excepting that the W-5 solution was replaced by 5 cc. of a composition obtained by dissolving 180 parts of acrylamide in 120 parts of water. The results were similar to those of Example I.

Example XI

The procedure was the same as in Example I excepting that to 5 cc. of the W-5 composition there was added 1 g. of acrylonitrile. Photopolymerization in this case occurred in about 20 minutes.

Example XII

The procedure was the same as in Example I excepting that 1 cc. of a 10% dispersion of vinyl acetate was added to the W-5 solution. Photopolymerization by irradiation according to the procedure of Example I ensued in a period of about 8 minutes.

Example XIII

To 5 cc. of W-5 were added 1 cc. of an aqueous solution containing 3.98 mg. of silver nitrate and 1 cc. of an aqueous solution containing .68 mg. of sodium chloride, enough to precipitate one-half of the silver as silver chloride. About 25 mg. of zinc oxide were then added. By exposing the reaction mixture to the light of a 150 watt tungsten lamp at a distance of 6", photopolymerization was achieved in 6½ minutes.

By using the same composition without the addition of zinc oxide and exposing under the same conditions, photopolymerization required 7½ minutes.

Example XIV

To 5 cc. of W-5 were added 1 cc. of an aqueous solution containing 1.4 mg. of potassium bromide and 1 cc. of an aqueous solution containing 3.98 mg. of silver nitrate. One-half of the total silver was converted to silver bromide. 25 mg. of zinc oxide were then added.

By irradiating as in Example I, photopolymerization was achieved in 4½ minutes. By omitting the zinc oxide and exposing in the same way, photopolymerization required 6½ minutes.

Example XV

To 5 cc. of W-5 were added 1 cc. of an aqueous solution containing 1.94 mg. of potassium iodide and 1 cc. of an aqueous solution containing 3.98 mg. of silver nitrate. The silver nitrate was enough to convert one-half of the silver to silver iodide. 25 mg. of zinc oxide were then added to the mixture.

Exposure of the mixture to the rays of a 150 watt tungsten lamp at a distance of 6" caused photopolymerization to take place in 10½ minutes. A control composition from which the zinc oxide was omitted required 14¾ minutes to photopolymerize under the same conditions.

Example XVI

To the composition of Example XIV were added 2 drops of a .1% aqueous solution of erythrosin. By exposing the resulting composition as in Example I, photopolymerization ensued in 3 minutes. Without the erythrosin, photopolymerization required 4½ minutes.

Similar results were achieved with the erythrosin replaced by such optical sensitizers as eosin, pinacyanol and other sensitizers mentioned above.

Example XVII

To the composition of Example XV containing zinc oxide were added 2 drops of an aqueous solution of erythrosin.

Irradiation of the resulting composition as in Example I caused photopolymerization to take place in 5¾ minutes. A control composition from which the dye was omitted did not photopolymerize until 8½ minutes.

Modifications of the invention will occur to persons skilled in the art. Thus, in lieu of the monomers listed in the examples, any of those mentioned above may be employed. Similarly, water soluble silver salts other than silver nitrate are as effective as the nitrate. I, therefore, do not intend to be limited in the patent granted except as necessitated by the appended claims.

I claim:

1. The process of photopolymerizing normally liquid to normally solid vinyl monomers, which comprises irradiating such monomers in the presence of water with radiations of a wave length ranging from $10^{-1}$ to $10^{-10}$ centimeters while utilizing catalytic amounts of a catalyst containing as its essential components a mixture of an insoluble silver halide selected from the class consisting of silver bromide, silver chloride and silver iodide and a silver salt more water soluble than the silver halide.

2. The process as defined in claim 1 wherein photopolymerization is effected by radiation with visible light.

3. The process as defined in claim 1 wherein the vinyl monomer is water soluble and the photopolymerization is effected in the aqueous phase.

4. The process as defined in claim 1 wherein the monomer is water insoluble and the photopolymerization is effected in an aqueous dispersion.

5. The process as defined in claim 1 wherein the more water soluble silver salt is the salt of silver and an inorganic acid.

6. The process as defined in claim 1 wherein the more water soluble silver salt is a salt of silver and an organic acid.

7. The process as defined in claim 1 wherein the catalytic activity of the mixture of the silver compounds is promoted by means of an amphoteric metal oxide selected from the class consisting of zinc oxide, zirconium dioxide, titanium dioxide and silicon dioxide.

8. The process as defined in claim 1 wherein the silver halide is silver bromide.

9. The process as defined in claim 1 wherein the silver halide is silver chloride.

10. The process as defined in claim 1 wherein the silver halide is silver iodide.

11. The process as defined in claim 1 wherein the more water soluble silver salt is silver nitrate.

12. The process as defined in claim 1 wherein the silver halide is present in the mixture of from about .9 to .5 part by weight.

13. The process as defined in claim 1 wherein the reaction mixture contains an organic compound having at least two terminal vinyl groups as a cross-linking agent.

14. The process as defined in claim 13 wherein the cross-linking agent is selected from the class consisting of N,N'-methylene-bis-acrylamide, triallylcyanurate, divinyl benzene, divinyl ketone and diglycol-dioctylate.

15. The process as defined in claim 13 wherein one part of the cross-linking agent is employed for each 10–50 parts of monomer.

16. The process as defined in claim 1 wherein zinc oxide is added as a promoter for the catalytic silver mixture.

17. The process as defined in claim 1 wherein colloidal silica is added as the promoter for the catalytic silver mixture.

18. The process as defined in claim 1 wherein colloidal zirconium dioxide is added as the promoter for the catalytic mixture.

19. The process as defined in claim 1 wherein titanium dioxide is added as the promoter for the catalytic mixture.

20. The process as defined in claim 8 wherein the photopolymerization is effected in the presence of an optical sensitizing dye.

21. The process as defined in claim 20 wherein the optical sensitizing dye is erythrosin.

22. The process as defined in claim 20 wherein the optical sensitizing dye is eosin.

23. The process as defined in claim 20 wherein the optical sensitizing dye is pinacyanol.

References Cited in the file of this patent

UNITED STATES PATENTS

| | | |
|---|---|---|
| 1,241,738 | Klatte et al. | Oct. 2, 1917 |
| 2,510,426 | Smith | June 6, 1950 |
| 2,661,331 | Howard | Dec. 1, 1953 |

OTHER REFERENCES

Oster: Photogaphic Engineering, vol. 4, No. 3 (1953), pages 176–178.

Martin: Chemical and Engineering News, vol. 33 (April 1955), pages 1424 and 1428.